US012668102B2

(12) United States Patent
Nakabayashi

(10) Patent No.: US 12,668,102 B2
(45) Date of Patent: Jun. 30, 2026

(54) HEAT MANAGEMENT DEVICE FOR VEHICLE

(71) Applicant: TOYOTA JIDOSHA KABUSHIKI KAISHA, Toyota (JP)

(72) Inventor: Ryo Nakabayashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 18/824,909

(22) Filed: Sep. 5, 2024

(65) Prior Publication Data

US 2025/0162380 A1 May 22, 2025

(30) Foreign Application Priority Data

Nov. 21, 2023 (JP) ................................. 2023-197398

(51) Int. Cl.
B60H 1/00 (2006.01)
B60H 1/14 (2006.01)

(52) U.S. Cl.
CPC ..... B60H 1/00899 (2013.01); B60H 1/00278 (2013.01); B60H 1/143 (2013.01); B60H 1/00385 (2013.01)

(58) Field of Classification Search
CPC ............ B60H 1/00278; B60H 1/00889; B60H 1/143; B60H 1/0385; F25B 2600/2513
See application file for complete search history.

(56) References Cited

U.S. PATENT DOCUMENTS

| 2022/0009309 A1 | 1/2022 | Miura et al. |
| 2022/0011006 A1* | 1/2022 | Miura ................ B60H 1/00899 |
| 2023/0052705 A1* | 2/2023 | Miura ........................ F25B 5/02 |

FOREIGN PATENT DOCUMENTS

| JP | 2020-165604 A | 10/2020 |

* cited by examiner

*Primary Examiner* — Jonathan Bradford
(74) *Attorney, Agent, or Firm* — SoraIP, Inc.

(57) ABSTRACT

When switching from the first mode in which there is a heating request for the air conditioner and there is a cooling request for the battery to the second mode in which there is a heating request for the air conditioner and there is no cooling request for the battery, the opening degree of the electric expansion valve of the refrigerant circuit is reduced for a predetermined period. Then, after a predetermined period of time has elapsed, the mode is switched from the first mode to the second mode.

5 Claims, 4 Drawing Sheets

FIG. 1

CIRCUIT A

CIRCUIT B

FIG. 3A

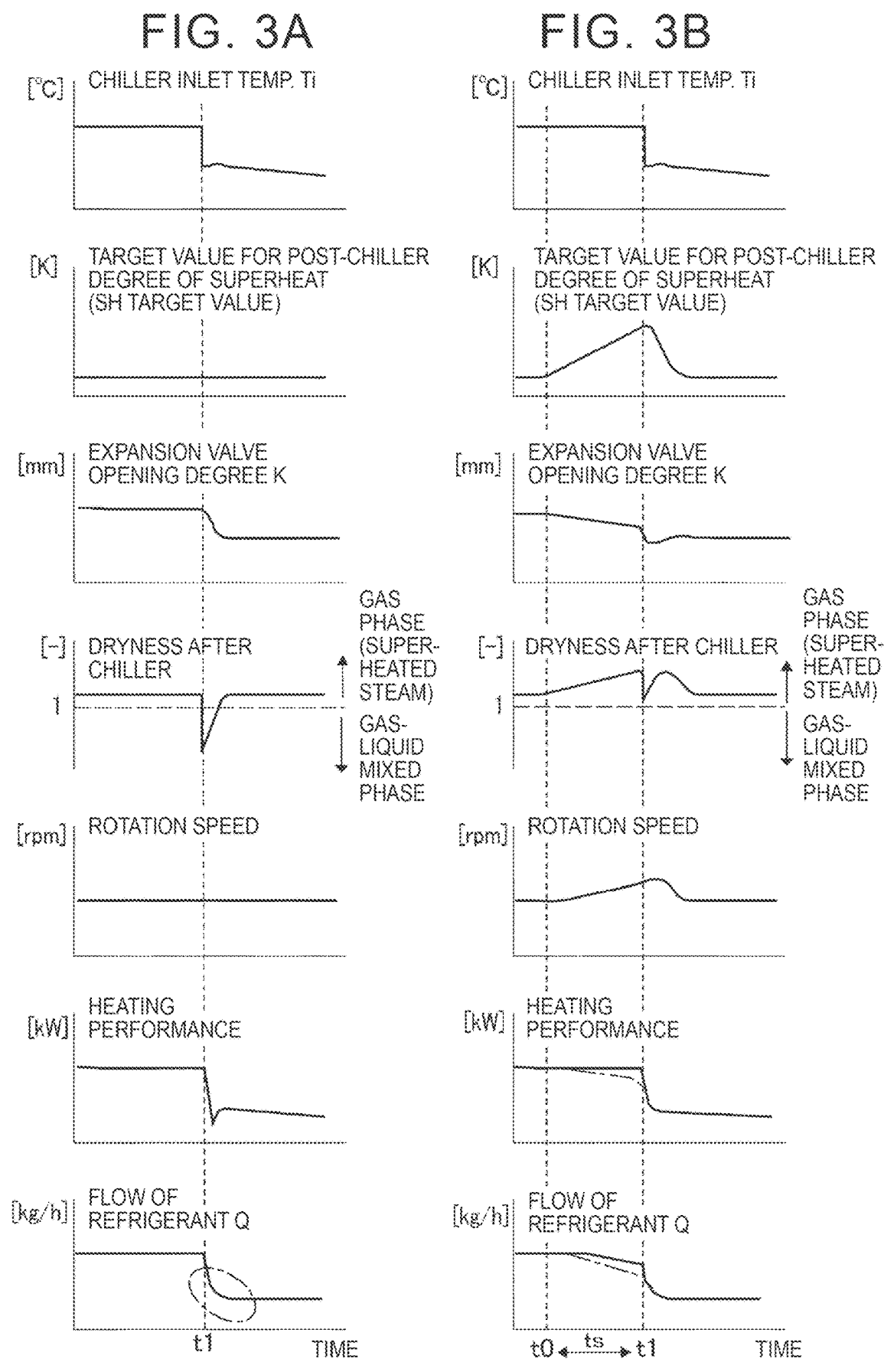

[°C] CHILLER INLET TEMP. Ti

[K] TARGET VALUE FOR POST-CHILLER DEGREE OF SUPERHEAT (SH TARGET VALUE)

[mm] EXPANSION VALVE OPENING DEGREE K

[-] DRYNESS AFTER CHILLER

GAS PHASE (SUPER-HEATED STEAM)

1

GAS-LIQUID MIXED PHASE

[rpm] ROTATION SPEED

[kW] HEATING PERFORMANCE

[kg/h] FLOW OF REFRIGERANT Q t1    TIME

FIG. 3B

[°C] CHILLER INLET TEMP. Ti

[K] TARGET VALUE FOR POST-CHILLER DEGREE OF SUPERHEAT (SH TARGET VALUE)

[mm] EXPANSION VALVE OPENING DEGREE K

[-] DRYNESS AFTER CHILLER

GAS PHASE (SUPER-HEATED STEAM)

1

GAS-LIQUID MIXED PHASE

[rpm] ROTATION SPEED

[kW] HEATING PERFORMANCE

[kg/h] FLOW OF REFRIGERANT Q t0 ← ts → t1    TIME

CONTROL
AT CIRCUIT SWITCHING

START

S10
CIRCUIT A → CIRCUIT B
SWITCH REQUEST?          NO

YES          S11

NO          ΔTi ≥ S ?

YES

S12
INCREASED TARGET SH

S13
INCREASE TARGET
SPEED

S14
NO          ts ELAPSED
FOR THE SPECIFIED
PERIOD?

YES          S15

S17
CIRCUIT A ⇒ CIRCUIT B
SWITCHING

CIRCUIT A ⇒ CIRCUIT B
SWITCHING

S16
NORMAL CONTROL
OF TARGET SH AND
TARGET REVOLUTION

END

HEAT MANAGEMENT DEVICE FOR VEHICLE

CROSS-REFERENCE TO RELATED APPLICATION

This application claims priority to Japanese Patent Application No. 2023-197398 filed on Nov. 21, 2023, incorporated herein by reference in its entirety.

BACKGROUND

1. Technical Field

The present disclosure relates to a heat management device for a vehicle.

2. Description of Related Art

Japanese Unexamined Patent Application Publication No. 2020-165604 (JP 2020-165604 A) discloses a refrigerant circuit device applied to an air conditioner of a battery electric vehicle. In this refrigerant circuit device, heat from a battery and from outside air, absorbed by a chiller disposed on a refrigerant circuit (heat pump cycle), is utilized for heating of a vehicle cabin. The heat from the battery and from the outside air is absorbed in the chiller by a low-temperature side heat medium circuit.

SUMMARY

The refrigerant circuit device according to JP 2020-165604 A has a heating mode, and a cooling and heating mode. In the heating mode, the vehicle cabin is heated without cooling the battery. In the cooling and heating mode, heat absorbed during the cooling of the battery is used for heating the vehicle cabin. Accordingly, when switching from the cooling and heating mode to the heating mode, heat absorption from the battery is lost. Temperature of the low-temperature side heat medium flowing into the chiller drops. Refrigerant flowing into a compressor of the refrigerant circuit is in a liquid phase or a gas-liquid phase state. Trouble occurs at the compressor. In JP 2020-165604 A, when the cooling of the battery by the low-temperature side heat medium circuit (low-temperature side circuit) is stopped, rotational speed of the compressor is reduced, or an opening degree of an expansion valve for depressurizing the refrigerant flowing into the chiller is reduced. As a result, a flow of the refrigerant flowing into the chiller is reduced, and the occurrence of carryover, in which liquid phase refrigerant flows into the compressor, is suppressed.

There are cases in which response delay occurs when the opening degree of the expansion valve is reduced. In this case, the flow of the refrigerant flowing into the chiller is temporarily excessively great, and there is a concern that the occurrence of carryover, in which liquid phase refrigerant flows into the compressor, cannot be suppressed.

An object of the present disclosure is to suppress the refrigerant flowing into the compressor of the refrigerant circuit from being in a liquid phase or a gas-liquid phase state, even when response delay of the expansion valve occurs.

A heat management device for a vehicle according to the present disclosure includes a refrigerant circuit that includes a compressor for compressing and discharging refrigerant flowing out from a chiller, a condenser for dissipating heat of the refrigerant discharged from the compressor, and an expansion valve for depressurizing the refrigerant flowing out from the condenser, in which the chiller performs heat exchange between the refrigerant depressurizing by the expansion valve and a low-temperature side heat medium, a low-temperature side circuit that includes a heat exchanger that causes the low-temperature side heat medium to absorb heat of a battery, heat of a vehicle drive device, and heat of outside air, an air conditioner that performs heating by utilizing heat dissipation at the condenser, and a control device.

The control device is configured to, in a first state in which a heating request is made and a cooling request for the battery is also made, control an opening degree of the expansion valve to a predetermined opening degree, such that cooling of the battery and the heating are executed, by performing heat exchange between the refrigerant and the low-temperature side heat medium that absorbed the heat of the battery, at the chiller, and when switching from the first state to a second state in which the heating request is made but no cooling request is made, switch from the first state to the second state following the opening degree of the expansion valve being set to a smaller opening degree than the predetermined opening degree for a predetermined period.

In the second state, the low-temperature side heat medium does not flow into the heat exchanger of the battery.

According to this configuration, at the chiller, the refrigerant in the refrigerant circuit absorbs heat from the low-temperature side heat medium that has absorbed the heat of the battery, the heat of the vehicle drive device, and the heat of the outside air, and dissipates the heat in the condenser so as to be utilized for heating. Accordingly, the heat of the battery, the heat of the vehicle drive device, and the heat of the outside air, are used for heating.

The control device controls the opening degree of the expansion valve to the predetermined opening degree in the first state in which there is the heating request and there is also the cooling request regarding the battery, and the refrigerant executes the cooling of the battery and the heating of the air conditioner by performing heat exchange with the low-temperature side heat medium that has absorbed the heat of the battery, at the chiller. In the second state in which there is the heating request but there is no cooling request, the low-temperature side heat medium does not flow into the heat exchanger of the battery, and accordingly the heat of the battery is not utilized for heating. When switching from the first state to the second state, the control device switches from the first state to the second state following the opening degree of the expansion valve being set to a smaller opening degree than the predetermined opening degree for a predetermined period.

In the first state, the battery is cooled, and accordingly the heat of the battery is absorbed by the low-temperature side heat medium, but in the second state, the battery is not cooled, and accordingly the heat of the battery is not absorbed by the low-temperature side heat medium. Thus, when switching from the first state to the second state, temperature of the low-temperature side heat medium flowing into the chiller drops. At this time, even when the opening degree of the expansion valve is reduced and the flow of the refrigerant flowing into the chiller decreases, there is a concern that the flow of the refrigerant temporarily will become excessive due to the response delay of opening degree change of the expansion valve, and that carryover will occur in which liquid phase refrigerant flows into the compressor.

According to this configuration, when switching from the first state to the second state, the first state is switched to the second state following the opening degree of the expansion valve being set to a smaller opening degree than the predetermined opening degree for a predetermined period of time. During the predetermined period in which the opening degree of the expansion valve is small, the flow of the refrigerant flowing into the chiller decreases, and also the dryness (quality) of the refrigerant increases, and accordingly occurrence of carryover can be suppressed when switching from the first state to the second state.

Preferably, in the second state, the heating may be executed by the refrigerant performing heat exchange with the low-temperature side heat medium that absorbed heat of at least one of the vehicle drive device and the outside air, at the chiller.

According to this configuration, in the second state, heating of the air conditioner can be performed by utilizing heat of at least one of the vehicle drive device and the outside air.

Preferably, when switching from the first state to the second state, the control device may control the opening degree of the expansion valve to a smaller opening degree than the predetermined opening degree for the predetermined period when temperature of the low-temperature side heat medium flowing into the chiller is predicted to decrease by a predetermined temperature or more.

When switching from the first state to the second state, when it is predicted that the temperature of the low-temperature side heat medium flowing into the chiller will be lower than the predetermined temperature, there is a high possibility that carryover will not occur. According to this configuration, when the temperature of the low-temperature side heat medium flowing into the chiller is predicted to decrease by a predetermined temperature or more when switching from the first state to the second state, the opening degree of the expansion valve is made smaller than the predetermined opening degree for a predetermined period of time. When there is a high possibility that carryover will not occur, the flow of the refrigerant flowing into the chiller does not decrease, and accordingly the decrease in the heating performance can be reduced.

Preferably, the control device may control the opening degree of the expansion valve such that a degree of superheat of the refrigerant flowing out from the chiller becomes a target value, and during the predetermined period, control the opening degree of the expansion valve to be smaller than the predetermined opening degree, by incrementally correcting the target value.

According to this configuration, the opening degree of the expansion valve is controlled such that the degree of superheat of the refrigerant flowing out of the chiller becomes the target value. The target value is incrementally corrected for a predetermined period of time. Thus, the opening degree of the expansion valve is made to be smaller than the predetermined opening degree. Accordingly, for example, the degree of superheat of the refrigerant flowing into the compressor can be maintained at one or higher. Carryover can be suppressed.

Preferably, in the above configuration, the control device may be configured to increase a rotational speed of the compressor during the predetermined period.

According to this configuration, the rotational speed of the compressor is increased for a predetermined period, and accordingly, amount of decrease in the flow of the refrigerant can be suppressed while setting the degree of superheat of the refrigerant flowing out of the chiller to the target value, and also decrease in the heating performance before switching from the first state to the second state can be reduced.

According to the present disclosure, even when response delay of the expansion valve occurs, a situation in which the refrigerant flowing into the compressor of the refrigerant circuit is in the liquid phase or the gas-liquid phase state can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram illustrating a schematic configuration of a heat management device for a vehicle according to an embodiment of the present disclosure;

FIG. 3A is a diagram showing a transition of various parameters when switched from the first mode (circuit A) to the second mode (circuit B);

FIG. 3B is a diagram showing a transition of various parameters when switching from the first mode (circuit A) to the second mode (circuit B)

DETAILED DESCRIPTION OF EMBODIMENTS

Figure 2A:
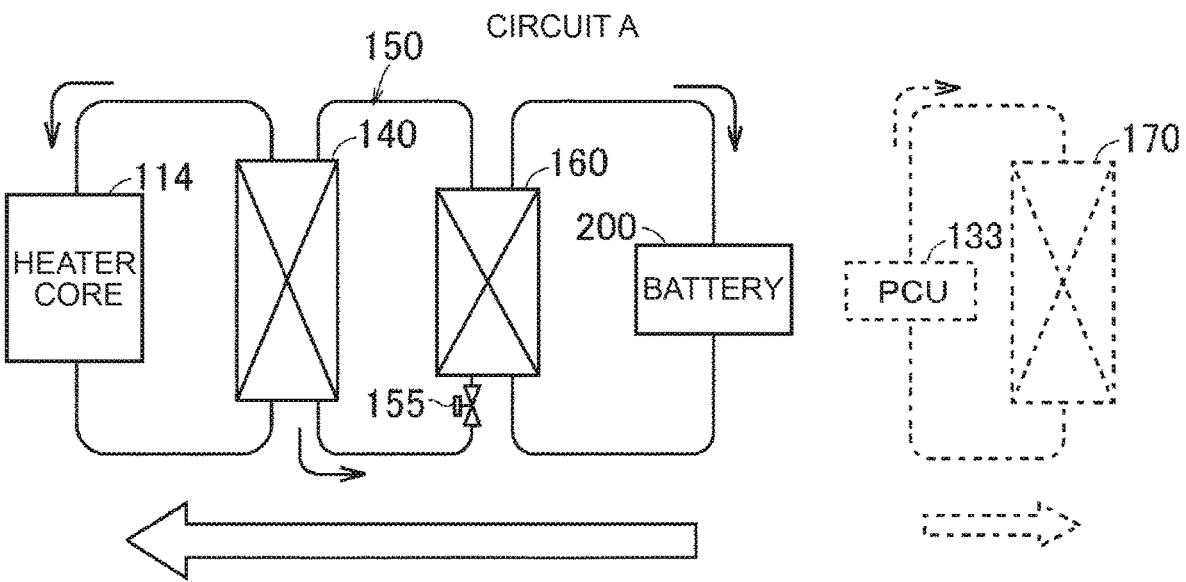
FIG. 2A is a diagram showing a flow of heat during heating of the air conditioner 2.

An embodiment of the present disclosure will be described in detail with reference to the drawings. The same or corresponding parts in the drawings are designated by the same reference signs and repetitive description will be omitted.

Figure 1:
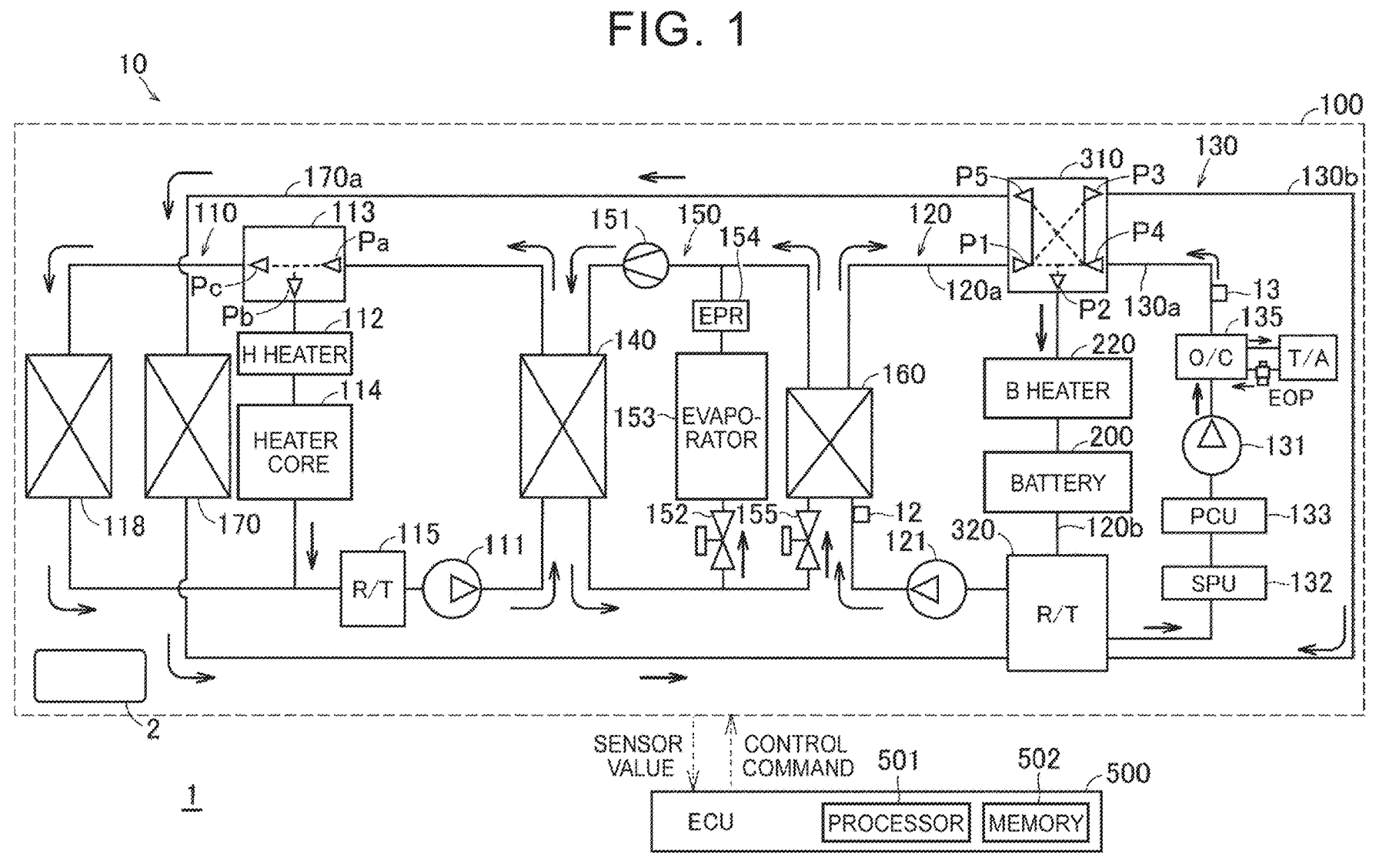

FIG. 1 is a diagram illustrating a schematic configuration of a heat management device of a vehicle according to this embodiment. As shown in FIG. 1, the vehicle 1 is an electrified vehicle (xEV) on which the heat management device 10 according to this embodiment is mounted. The vehicle 1 is BEV (battery electric vehicle). However, the vehicle 1 may be, for example, an industrial vehicle, or may be another electrified vehicle such as a plug-in hybrid electric vehicle.

The heat management device 10 includes a heat management circuit 100 and an ECU (Electronic Control Unit) 500. ECU500 includes a processor 501 and memories 502. The processor 501 executes the program stored in the memory 502 to execute various types of thermal control in ECU500. ECU500 corresponds to an exemplary "control device" of the present disclosure.

The heat management device 10 is configured to perform heat management of the vehicle 1 using the heat medium of the heat management circuit 100. The heat management circuit 100 includes a first circuit 110, a second circuit 120, and a third circuit 130. The heat management circuit 100 also includes a condenser 140, a refrigerant circuit 150, a chiller 160, a five-way valve 310, and a reservoir tank (R/T) 320. The five-way valve 310 and the reservoir tank 320 are shared by the second circuit 120 and the third circuit 130.

The condenser 140, the refrigerant circuit 150, and the chiller 160 are disposed between the first circuit 110 and the second circuit 120. The second circuit 120, the third circuit 130, and the flow path 170a described later correspond to an exemplary "low-temperature side circuit" according to the present disclosure, and are hereinafter also referred to as low-temperature side circuits.

The first circuit 110 includes a first flow path through which the high-temperature-side heat medium flows. The first circuit 110 includes a pump 111, an electric heating heater 112, a three-way valve 113, a heater core 114, and a reservoir tank (R/T) 115 and hot radiator 118. The three-way valve 113 switches the path of the hot-side heating medium. The pump 111 circulates the hot side heat medium to the first circuit 110. The high-temperature-side heat medium exchanges heat with each device during passage. The heater core 114 is used as a heating source (heat source) of the air conditioner 2.

The five-way valve 310 switches the path of the low-temperature side heat medium. The five-way valve 310 comprises five-ports P1 to P5. ECU500 controls the five-way valve 310 so as to be one of the first to fifth connecting patterns. Hereinafter, the ports P1, P2, P3, P4, P5 may be simply referred to as "P1", "P2", "P3", "P4", and "P5", respectively.

In the first connection pattern, P1 and P2 are connected, P3 and P4 are connected, and P5 is disconnected. In the second connection pattern, P1 and P2 are connected, P4 and P5 are connected, and P3 is disconnected. In the third connection pattern, P1 and P5 are connected, P3 and P4 are connected, and P2 is disconnected. In the fourth connection pattern, P2 and P4 are connected, P1 and P3 are connected, and P5 is disconnected. In the fifth connection pattern, P2 and P4 are connected, P1 and P5 are connected, and P3 is disconnected.

A flow path 120a, 120b is connected to each of the ports P1, P2 of the five-way valve 310. The flow path 120a is a flow path connecting the port P1 and the reservoir tank 320. The flow path 120b is a flow path connecting the port P2 and the reservoir tank 320. When P1 and P2 of the five-way valve 310 are connected (for example, first and second connection patterns), the second circuit 120 including the flow path 120a and 120b is formed.

A pump 121 and a chiller 160 are disposed in the flow path 120a. A battery 200 and electric-type battery heaters 220 are disposed in the flow path 120b. The pump 121 circulates the low-temperature side heat medium to the second circuit 120. The low-temperature side heat medium exchanges heat with each device during passage. For this purpose, each device comprises a heat exchanger (or has the function of a heat exchanger). The battery 200 corresponds to an example of a "battery" of the present disclosure.

A flow path 130b, 130a is connected to each of the port P3, P4 of the five-way valve 310. The flow path 130b, 130a is a flow path connecting the port P3, P4 and the reservoir tank 320, respectively. P3 and P4 of the five-way valve 310 are connected to each other (for example, the first and third connection patterns) to form the third circuit 130 including the flow path 130a and 130b.

The high temperature side heat medium may be a known heat medium for heating, and the low-temperature side heat medium may be an insulating oil or an antifreeze. Further, in the refrigerant circuit 150 described later, a refrigerant such as hydrofluorocarbon (HFC), ammonia, or carbon dioxide may be used.

In the flow path 130a, a pump 131, a SPU (Signal Processing Unit) 132, a motor PCU (Power Control Unit)

133, and an oil cooler (O/C) 135 are disposed. The oil cooler 135 cools the trunk axle of the vehicle 1. The pump 131 circulates the low-temperature side heat medium to the third circuit 130. The low-temperature side heat medium exchanges heat with each device during passage. For this purpose, each device comprises a heat exchanger (or has the function of a heat exchanger). The motor PCU133 and the oil cooler 135 correspond to an exemplary "vehicle-drive device" of the present disclosure.

A flow path 170a is connected to a port P5 of the five-way valve 310. The flow path 170a is a flow path connecting the port P5 and the reservoir tank 320. A low-temperature radiator 170 is provided in the flow path 170a. The low-temperature radiator 170 functions as a heat exchanger. The low-temperature radiator 170 exchanges heat between the low-temperature side heat medium flowing through the flow path 170a and the outside air.

The refrigerant circulates in the refrigerant circuit 150. Refrigerant circuit 150 includes a compressor 151, an electric expansion valve 152, an evaporator 153, and an evaporative pressure-regulating valve (EPR: Evaporative Pressure Regulator) 154 and electric expansion valve 155. The compressor 151 compresses and discharges the refrigerant flowing out of the chiller 160. The refrigerant circuit 150 is a refrigeration cycle or a heat pump cycle. The electric expansion valve 155 corresponds to an "expansion valve" of the present disclosure.

The evaporator 153 is used as a cooling source of the air conditioner 2. The condenser 140 is connected to both the first circuit 110 and the refrigerant circuit 150, and functions as a heat exchanger. The condenser 140 exchanges heat between the high-temperature-side heat medium flowing through the first circuit 110 and the refrigerant circulating through the refrigerant circuit 150. The chiller 160 is connected to both the refrigerant circuit 150 and the flow path 120a, and functions as a heat-exchanger. The chiller 160 exchanges heat between the refrigerant circulating in the refrigerant circuit 150 and the low-temperature side heat medium flowing through the second circuit 120. As described above, the condenser 140, the refrigerant circuit 150, and the chiller 160 are configured to perform heat transfer between the high-temperature-side heat medium flowing through the first circuit 110 and the low-temperature side heat medium flowing through the second circuit 120.

The air conditioner 2 heats the vehicle cabin by using the heat dissipation of the condenser 140. At the time of heating of the air conditioner 2, the three-way valve 113 is connected to the port Pa and Pb, and the high-temperature-side heat medium absorbed in the condenser 140 dissipates heat in the heater core 114, thereby performing heating. When heating, the five-way valve 310 is set to, for example, the second connection pattern (P1 and P2, P4 and P5 are connected), and when the battery 200 is cooled in the low-temperature side circuit, the heat (waste heat) of the battery 200 absorbed by the low-temperature side heat medium is absorbed by the refrigerant in the refrigerant circuit 150 in the chiller 160. The heat of the battery 200 is absorbed by the high-temperature-side heat medium in the condenser 140. Heat (waste heat) of the battery 200 is used for heating. In this way, a mode in which the heating and the cooling of the battery 200 are simultaneously executed is referred to as a first mode. The first mode corresponds to an example of the "first state" of the present disclosure.

When the cooling request of the battery 200 disappears during the heating of the air conditioner 2, the cooling of battery 200 is stopped. Therefore, when the low-temperature side circuit is switched and, for example, the five-way valve 310 is set to the third connection pattern (P1, P5, P3, and P4 are connected), the low-temperature side heat medium cannot exchange heat with the battery 200. Therefore, heat (waste heat) of the battery 200 cannot be used for heating. In this case, when the temperature of the low-temperature side heat medium is lower than the outside air, the low-temperature side heat medium absorbs the heat of the outside air in the low-temperature radiator 170. The low-temperature side heat medium absorbs heat from the motor PCU133 and the oil cooler 135. The heat is absorbed by the refrigerant in the refrigerant circuit 150 in the chiller 160. As described above, the heat of the outside air, the motor PCU133, and the oil cooler 135 is used for heating. In this way, a mode in which the battery 200 is not cooled but is heated is referred to as a second mode. The second mode corresponds to an example of the "second state" of the present disclosure.

Figure 2B:
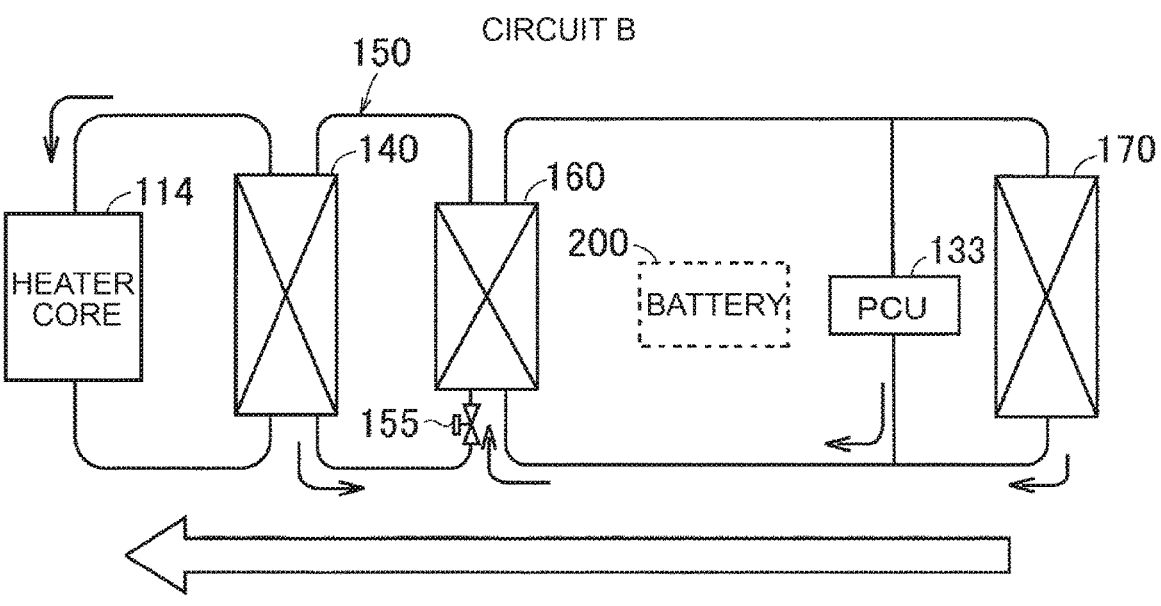
FIG. 2B is a diagram showing a flow of heat during heating of the air conditioner 2.

FIGS. 2A and 2B are diagrams illustrating a flow of heat during heating of the air conditioner 2. FIG. 2A shows the flow of heat during heating in the first mode, in this embodiment, the condition of the heat management circuit 100 is also referred to as circuit A. FIG. 2B shows the flow of heat during heating in the second mode, in this embodiment, the condition of the heat management circuit 100 is also referred to as circuit B. In the first mode, as shown in FIG. 2A, heat (waste heat) of the battery 200 absorbed by the low-temperature side heat medium is absorbed by the refrigerant of the refrigerant circuit 150 in the chiller 160. Heat of the battery 200 is absorbed by the high-temperature-side heat medium in the condenser 140 and dissipated from the heater core 114. In this way, heat (waste heat) of the battery 200 is used for heating. In the second mode, as shown in FIG. 2B, the heat of the outside air, the motor PCU133, and the oil cooler 135 is dissipated from the heater-core 114 and used for heating.

When the battery 200 is cooled, since the amount of heat generated by the battery 200 is large (the temperature of the battery 200 is high), the amount of heat absorbed by the low-temperature side heat medium flowing into the chiller 160 in the first mode (circuit A) is large. In the second mode (circuit B), the amount of heat absorbed by the low-temperature side heat medium from the outside air, the motor PCU133, and the oil cooler 135 is smaller than that in the first mode.

FIGS. 3A and 3B are diagrams illustrating transition of various parameters when switching from the first mode (circuit A) to the second mode (circuit B). FIG. 3A shows the transition of the various parameters in the comparative embodiment, and FIG. 3B shows the transition of the various parameters in the present embodiment. In FIGS. 3A and 3B, from the upper stage, the chiller 160 inlet temperature of the low-temperature side heat medium (chiller inlet temperature Ti), the superheat degree target value (SH target value) after the chiller 160 of the refrigerant (the refrigerant circuit 150), the opening degree (the expansion valve opening degree K) of the electric expansion valve 155, the dryness degree (quality) after the chiller 160 of the refrigerant, the rotational speed of the compressor 151, the heating performance of the air conditioner 2, and the refrigerant flow rate Q flowing into the chiller 160.

In the comparative example, as shown in FIG. 3A, switching from the first mode (circuit A) to the second mode (circuit B) is performed in the time t1. When the circuit A is switched to the circuit B, the chiller inlet-temperature Ti rapidly decreases. Since the target value (SH target value) of the degree of superheat after the chiller 160 does not change, the expansion valve opening degree K is reduced in order to set the degree of superheat of the refrigerant to SH target value. At this time, due to the responsiveness of the opening change of the electric expansion valve 155, the refrigerant flow rate Q temporarily becomes excessively large with respect to the decrease in the chiller inlet-temperature Ti (see a portion surrounded by a dashed line). Therefore, the refrigerant cannot sufficiently absorb heat, the refrigerant flowing into the compressor 151 becomes a liquid phase or a gas-liquid mixed phase state, and a carryover is generated.

In the present embodiment shown in FIG. 3B, SH target value is increased and corrected from the time t0, which is the time ts prior to the predetermined time, from the time t1 to be switched from the circuit A to the circuit B, and SH target value is increased. The predetermined time ts corresponds to a "predetermined time period" of the present disclosure. In the time t0, when SH target value starts to be increased, the expansion valve opening degree K is decreased. As a result, the refrigerant flow rate Q decreases, and the degree of dryness (quality) of the refrigerant increases. In the time t1, when the circuit A is switched to the circuit B, the increase compensation of SH target value is stopped, and SH target value is returned to the normal value. As a result, the chiller inlet-temperature Ti rapidly decreases and the expansion valve opening degree K decreases. As the refrigerant flow rate Q decreases, the degree of dryness of the refrigerant increases. Therefore, even if the temperature Ti of the chiller inlet suddenly decreases and the expansion valve opening degree K decreases at the time t1, the refrigerant does not enter the liquid phase or the gas-liquid mixed phase. The occurrence of carryover can be suppressed.

In the present embodiment, the rotational speed of the compressor 151 is increased at the time t0, and the rotational speed of the compressor 151 is returned to the normal value at the time t1. When the expansion valve opening degree K decreases at the time t0, the refrigerant flow rate Q decreases and the heating performance decreases as indicated by a dashed-dotted line in FIG. 3B. By increasing the rotational velocity of the compressor 151 at the time t0, the reduction in the refrigerant flow rate Q can be suppressed as indicated by the solid line, and the reduction in the heating performance can also be suppressed.

Figure 4:
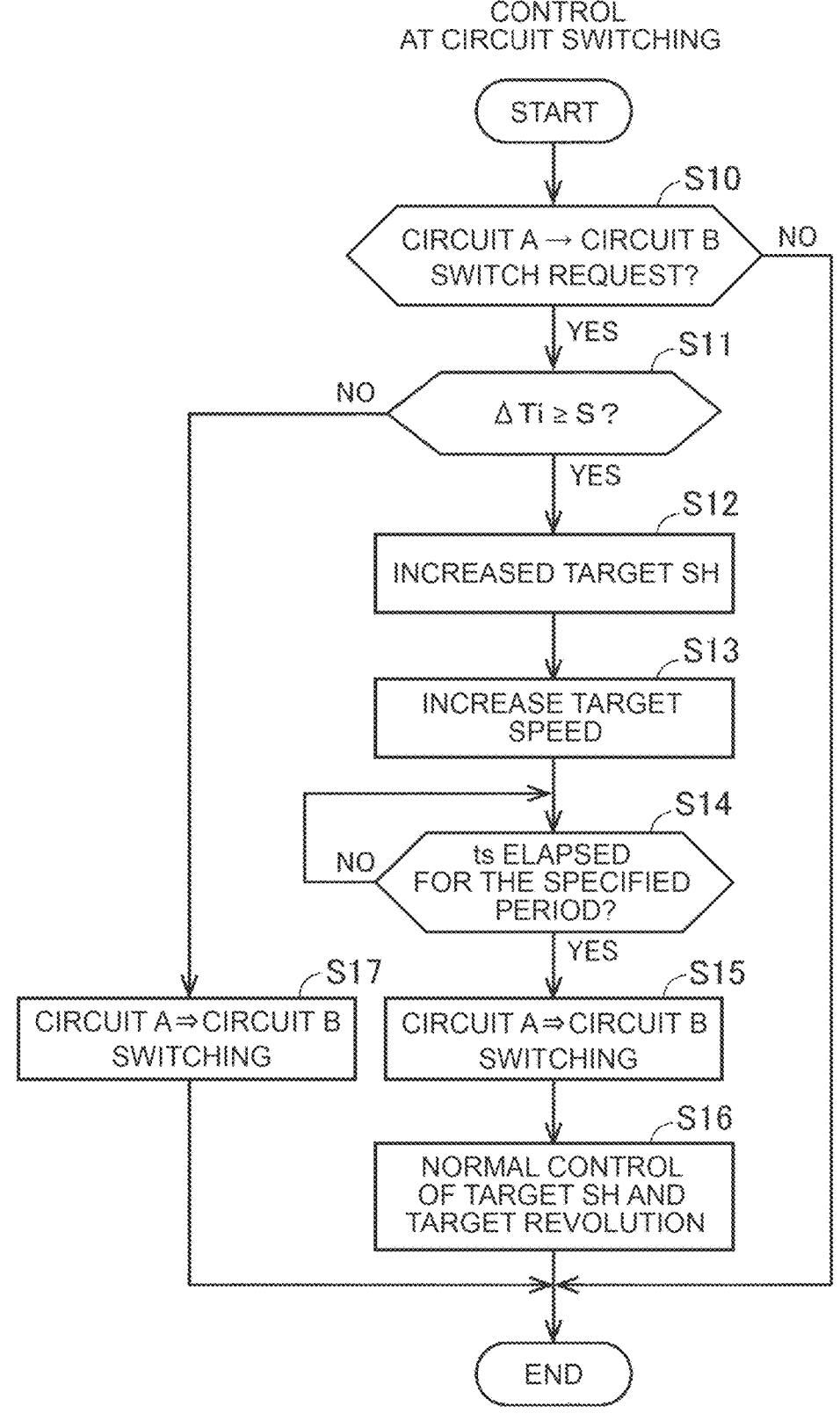
FIG. 4 is a flow chart illustrating an exemplary process of circuit-switching-time control executed by ECU.

FIG. 4 is a flow chart illustrating an exemplary process of circuit-switching-time control executed by ECU500. This flow chart is repeatedly executed at predetermined intervals when the power switch (ignition switch) of the vehicle 1 is ON. In step (hereinafter, step is abbreviated as "S") 10, it is determined whether there is a request for switching from the first mode (circuit A) to the second mode (circuit B). In the first mode, when there is a heating request for the air conditioner 2 and there is a cooling request for the battery 200, for example, the five-way valve 310 is set to the second connection pattern, and the heating in the vehicle cabin and the cooling of the battery 200 are performed. Then, when the battery 200 is cooled (the temperature of the battery 200 is lowered) and the cooling request disappears and the heating request continues, a switching request is generated so as to switch from the first mode to the second mode. The second mode is when there is a heating request for the air conditioner 2 and there is no cooling request for the battery 200. For example, the five-way valve 310 is set to the third connection pattern and does not cool the battery 200. The heat of the outside air, the motor PCU133, and the oil cooler 135 is used for heating.

When there is no request for switching from the first mode (circuit A) to the second mode (circuit B), a negative determination is made in S10, and the present routine is ended. When there is a request for switching from the first mode (circuit A) to the second mode (circuit B), an affirmative determination is made and the process proceeds to S11.

In S11, when switching from the circuit A to the circuit B, it is determined whether or not the chiller inlet temperature Ti decreases by a predetermined temperature S or more. A temperature sensor 12 provided at the inlet of the chiller 160 of the second circuit 120 detects the temperature of the low-temperature side heat medium (chiller inlet temperature Ti). A temperature sensor 13 provided at the outlet of the oil cooler 135 in the flow path 130a detects the low-temperature side heat medium temperature To. For example, when the first mode (circuit A) is set (in a state prior to switching from the circuit A to the circuit B), the estimated decrease temperature $\Delta$Ti is calculated by subtracting the low-temperature side heat medium temperature To from the chiller inlet temperature Ti ($\Delta$Ti=Ti–To). When the estimated decrease temperature $\Delta$Ti is equal to or higher than the predetermined temperature S ($\Delta$Ti>S), it is determined that the chiller inlet temperature Ti decreases by equal to or higher than the predetermined temperature S, and the process proceeds to S12. When the estimated lowering temperature $\Delta$Ti is less than the predetermined temperature S ($\Delta$Ti<S), a negative determination is made, the process proceeds to S17, and after switching from the circuit A to the circuit B, the present routine is ended.

In S12, the target SH (the target degree of superheat after the chiller 160 of the refrigerant) is increased. The increase in the target SH may be corrected to increase the target SH gradually, and the target SH may be increased stepwise. When the target SH is increased, the expansion valve opening degree K of the electric expansion valve 155 is decreased. As a result, the refrigerant flow rate Q flowing into the chiller 160 decreases, and the degree of dryness (quality) of the refrigerant after the chiller 160 increases. Therefore, in S15 to be described later, when switching from the circuit A to the circuit B, even if the chiller inlet-temperature Ti rapidly decreases and the expansion valve opening degree K decreases, the refrigerant does not become a liquid phase or a gas-liquid mixed phase, and it is possible to suppress the occurrence of carryover.

In a subsequent S13, the rotational velocity of the compressor 151 is increased. For example, an increase correction is performed so that the target rotation speed gradually increases. As a result, the amount of decrease in the refrigerant flow rate Q can be suppressed, and a decrease in the heating performance can be suppressed.

In S14, it is determined whether or not a predetermined period of ts has elapsed since the switching from the circuit A to the circuit B was requested. When the predetermined time ts elapses after repeating S14 process until the predetermined time ts elapses, the process proceeds to S15.

In S15, after switching from the circuit A to the circuit B, the process proceeds to S16. In S16, the target SH and the target rotational speed of the compressor 151 are returned to the values of the normal control, and then the present routine is ended. The target SH and the normal control of the target rotational speed of the compressor 151 are set according to a heating request of the air conditioner 2, a degree of a cooling request, a temperature increase request of the battery 200, a degree of a cooling request, and the like. The predetermined temperature S, the predetermined time ts, the increase correction amount of the target SH, the increase correction amount of the target rotational speed, and the like are determined in advance in an experiment or the like, and are stored in the memory 502.

According to the present embodiment, ECU500 controls the expansion valve opening degree K of the electric expansion valve 155 to a predetermined opening degree in a first mode (circuit A) in which there is a heating request and there is a cooling request for the battery 200. The refrigerant exchanges heat with the low-temperature side heat medium that absorbs the heat of the battery 200 in the chiller 160. As a result, the battery 200 is cooled and the vehicle cabin is heated. In the second mode (circuit B) in which there is a heating request and there is no cooling request, since the low-temperature side heat medium does not flow to the heat exchanger of the battery 200, the heat of the battery 200 is not used for heating. When switching from the first mode to the second mode, ECU500 switches from the first mode to the second mode after the expansion valve opening degree K of the electric expansion valve 155 is made smaller than the predetermined opening degree for a predetermined period of ts. Thus, during a predetermined period of ts, the refrigerant flow rate Q is reduced and the degree of dryness (quality) of the refrigerant is increased, so that even if there is a response delay of the opening degree change of the electric expansion valve 155, it is possible to suppress the generation of carryover when switching from the first mode to the second mode.

According to the present embodiment, in the second mode (circuit B), the refrigerant exchanges heat with the low-temperature side heat medium that absorbs heat of at least one of the motor PCU133, the oil cooler 135, and the outside air in the chiller 160. Thus, heating is performed. Therefore, the air conditioner 2 can be heated by using at least one of the heats of the motor PCU133, the oil cooler 135, and the outside air.

According to the present embodiment, ECU500 controls the expansion valve opening degree K of the electric expansion valve 155 so that the degree of superheat of the refrigerant flowing out of the chiller 160 becomes SH target value. ECU500 increases and corrects SH target value for a predetermined period of ts to make the expansion valve opening degree K smaller than the predetermined opening degree. ECU500 has increased the rotational velocity of the compressor 151 for a predetermined period of ts. During the predetermined period of ts, since the rotational speed of the compressor is increased, it is possible to suppress the reduction in the refrigerant flow rate Q while increasing degree of superheat of the refrigerant flowing out of the chiller, it is possible to reduce the decrease in the heating performance prior to switching from the first mode to the second mode.

In the above-described embodiment, when switching from the first mode (circuit A) to the second mode (circuit B), ECU300 predicts that the temperature of the low-temperature side heat medium flowing into the chiller 160 decreases by a predetermined temperature S or more (affirmative determination in S11). In this situation, ECU300 sets the expansion valve opening degree K of the electric expansion valve 155 to be smaller than the predetermined opening degree during the predetermined period of ts. Thus, when switching from the circuit A to the circuit B, it is predicted that the temperature of the low-temperature side heat medium flowing into the chiller 160 is less than the predetermined temperature S. When there is a high possibility that carryover does not occur, the refrigerant flow rate Q flowing into the chiller is not lowered. This can reduce the deterioration of the heating performance.

Note that S11 may be omitted, and S12 may be executed regardless of the magnitude of the estimated decrease-temperature $\Delta$Ti.

In addition, in a case where a large heating performance is required by the air conditioner 2, the heating heater 112 provided in the first circuit 110 may be energized to perform heating. Note that the heating heater 112 may not be provided.

The embodiment disclosed herein shall be construed as exemplary and not restrictive in all respects. The scope of the present disclosure is shown by the claims rather than by the above description of the embodiments, and is intended to include all modifications within the meaning and scope equivalent to those of the claims.

What is claimed is:

1. A heat management device for a vehicle, the heat management device comprising:

a refrigerant circuit that includes a compressor for compressing and discharging refrigerant flowing out from a chiller, a condenser for dissipating heat of the refrigerant discharged from the compressor, and an expansion valve for depressurizing the refrigerant flowing out from the condenser, in which the chiller performs heat exchange between the refrigerant depressurizing by the expansion valve and a low-temperature side heat medium;

a low-temperature side circuit that includes a heat exchanger that causes the low-temperature side heat medium to absorb heat of a battery, heat of a vehicle drive device, and heat of outside air;

an air conditioner that performs heating by utilizing heat dissipation at the condenser; and a control device, wherein the control device is configured to, in a first state in which a heating request is made and a cooling request for the battery is also made, control an opening degree of the expansion valve to a predetermined opening degree, such that cooling of the battery and the heating are executed, by performing heat exchange between the refrigerant and the low-temperature side heat medium that absorbed the heat of the battery, at the chiller, and when switching from the first state to a second state in which the heating request is made but no cooling request is made, switch from the first state to the second state following the opening degree of the expansion valve being set to a smaller opening degree than the predetermined opening degree for a predetermined period, and in the second state, the low-temperature side heat medium does not flow into the heat exchanger of the battery.

2. The heat management device according to claim 1, wherein, in the second state, the heating is executed by the refrigerant performing heat exchange with the low-temperature side heat medium that absorbed heat of at least one of the vehicle drive device and the outside air, in the chiller.

3. The heat management device according to claim 2, wherein, when switching from the first state to the second state, the control device controls the opening degree of the expansion valve to a smaller opening degree than the predetermined opening degree for the predetermined period when temperature of the low-temperature side heat medium flowing into the chiller is predicted to decrease by a predetermined temperature or more.

4. The heat management device according to claim 1, wherein the control device controls the opening degree of the expansion valve such that a degree of superheat of the refrigerant flowing out from the chiller becomes a target value, and during the predetermined period, controls the opening degree of the expansion valve to be smaller than the predetermined opening degree, by incrementally correcting the target value.

5. The heat management device according to claim 4, wherein the control device is configured to increase a rotational speed of the compressor during the predetermined period.

\* \* \* \* \*